(12) United States Patent
Shield et al.

(10) Patent No.: US 7,574,719 B1
(45) Date of Patent: Aug. 11, 2009

(54) PROGRAM GUIDE DATA COMPRESSION

(75) Inventors: Alan E. Shield, Issaquah, WA (US);
Robert M. Fries, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1371 days.

(21) Appl. No.: 10/185,967

(22) Filed: Jun. 27, 2002

(51) Int. Cl.
*G06F 3/00* (2006.01)
*G06F 13/00* (2006.01)
*H04N 5/445* (2006.01)

(52) U.S. Cl. ..................................... 725/39
(58) Field of Classification Search .............. 725/37, 725/39; 341/50
See application file for complete search history.

(56) References Cited

U.S. PATENT DOCUMENTS

| | | | |
|---|---|---|---|
| 4,843,389 A | 6/1989 | Lisle et al. | |
| 5,729,228 A | 3/1998 | Franaszek et al. | |
| 5,870,036 A | 2/1999 | Franaszek et al. | |
| 5,956,724 A | 9/1999 | Griffiths | |
| 5,991,713 A | 11/1999 | Unger et al. | |
| 6,005,561 A * | 12/1999 | Hawkins et al. | 715/500.1 |
| 6,088,699 A | 7/2000 | Gampper et al. | |
| 6,247,015 B1 | 6/2001 | Baumgartner et al. | |
| 2003/0141993 A1* | 7/2003 | Baldwin et al. | 341/50 |
| 2003/0145327 A1* | 7/2003 | Baldwin et al. | 725/49 |
| 2004/0172647 A1* | 9/2004 | Godwin | 725/36 |
| 2004/0268394 A1* | 12/2004 | Nichols et al. | 725/45 |
| 2005/0097604 A1* | 5/2005 | Shintani et al. | 725/44 |
| 2006/0092055 A1* | 5/2006 | Baldwin et al. | 341/87 |

\* cited by examiner

*Primary Examiner*—Joseph P Hirl
*Assistant Examiner*—Jivka Rabovianski
(74) *Attorney, Agent, or Firm*—Lee & Hayes, PLLC

(57) ABSTRACT

For data encoded with an encoding scheme, a data compression technique utilizes encoding scheme values as compression indexing values where the encoding scheme values are part of the encoding scheme, but are not used to encode the data. In an implementation, a data compression dictionary is generated and indexed with the unused encoding scheme values. In an eight-bit encoding scheme, for example, the data is compressed from each letter and/or number being represented with eight bits down to complete words, numbers, and/or combinations of words and numbers being represented with only two bytes.

58 Claims, 9 Drawing Sheets

List of Dictionary Words

| Size | Occurrences | Words |
|---|---|---|
| 56 | 8 | minutes |
| 35 | 5 | Raymond |
| 32 | 8 | 2002 |
| 32 | 8 | KQZX |
| 28 | 4 | Frasier |
| 24 | 8 | May |
| 18 | 2 | Everybody |
| 16 | 2 | Jeopardy |
| 16 | 2 | National |
| 16 | 2 | question |
| 14 | 2 | classic |
| 12 | 4 | 00p |
| 12 | 4 | 30p |
| 12 | 4 | and |
| 12 | 2 | answer |
| 12 | 3 | show |
| 12 | 3 | that |
| 10 | 2 | Loves |
| 10 | 2 | World |
| 9 | 3 | his |
| 8 | 2 | News |
| 8 | 2 | news |
| 8 | 2 | quiz |
| 6 | 2 | The |
| 6 | 2 | the |

*Fig. 5*

PROGRAM GUIDE DATA COMPRESSION

TECHNICAL FIELD

This invention relates to television-based entertainment and information architectures and, in particular, to program guide data compression.

BACKGROUND

Electronic program guide data for a television-based entertainment and information system includes information that describes programs such as television shows and movies. Program guide data can include such information as a program title, a program broadcast day and time, and a short description of the program. Program guide data can also include information such as program ratings, characters, actor names, station identifiers, channel identifiers, other schedule information, and so on.

Program guide data includes information and common words often repeated to describe the same programs that are broadcast or otherwise available each day at the same time, for example. Typically, the program titles, channel identifiers, much of the schedule information, and many of the program descriptions are repeated from one day to the next.

The program guide data is represented as string data that is typically encoded with the UTF-8 (Unicode Transformation Format-8) eight-bit encoding scheme. The UTF-8 encoding scheme can be used to encode string data that is represented with most of the characters that are defined by the UNICODE standard. This includes the ASCII (American Standard Code for Information Interchange) characters, and UTF-8 uses the same values as ASCII to represent those characters that are common to both encodings. Both the UTF-8 and ASCII encoding schemes use the character values of 0x20 to 0x7F (hex) to represent alphanumeric characters in the program guide data such as letters, numbers, punctuation marks, and the most common special characters. A value 0x00 (hex) is commonly used as a null terminator to indicate the end of a string of data.

In UTF-8 and ASCII encoding schemes, the values 0x01 to 0x1F (hex) (i.e., the values between 0x00 and 0x20) are commonly used to represent control characters, such as backspace, tab, return, escape, and the like. However, program guide data does not typically include, or otherwise use, these control characters and is therefore not encoded with values from 0x01 to 0x1F.

SUMMARY

For data encoded with an encoding scheme, a data compression technique utilizes encoding scheme values as compression indexing values where the encoding scheme values are part of the encoding scheme, but are not used to encode the data. In an implementation, a data compression dictionary is generated and indexed with the unused encoding scheme values. In an eight-bit encoding scheme, for example, the data is compressed from each letter and/or number being represented with eight bits down to complete words, numbers, and/or combinations of words and numbers being represented with only two bytes.

BRIEF DESCRIPTION OF THE DRAWINGS

The same numbers are used throughout the drawings to reference like features and components.

FIG. 5 illustrates a list of the words from the exemplary program guide data shown in FIG. 3 to be included in a data compression dictionary.

DETAILED DESCRIPTION

A program guide data compression system is described that generates a data compression dictionary which includes words of the program guide data indexed with encoding scheme values that are part of an encoding scheme used to encode the program guide data. While the encoding scheme values are part of the encoding scheme, they are a set of values not used to encode the program guide data. In an eight-bit encoding scheme, for example, the program guide data is compressed from each letter and/or number being represented with eight bits down to complete words, numbers, and/or combinations of words and numbers being represented with only two bytes.

Program guide data compression reduces the memory storage space needed to maintain, or otherwise store, the program guide data both at a program guide data provider and at a client device receiving the program guide data. Further, compressing the program guide data with the compression techniques described herein reduces the bandwidth needed to communicate the program guide data from a data provider, such as a network operator, to a client device.

The following discussion is directed to television-based entertainment and information systems, such as interactive TV networks, cable networks, and Web-enabled TV networks that utilize electronic and interactive program guides. Client devices in such systems range from full-resource clients with substantial memory and processing resources, such as TV-enabled personal computers and TV recorders equipped with hard-disks, to low-resource clients with limited memory and/or processing resources, such as traditional set-top boxes. While aspects of the described systems and methods can be used in any of these systems and for any types of client devices, they are described in the context of the following exemplary environment.

Exemplary System Architecture

Figure 1:
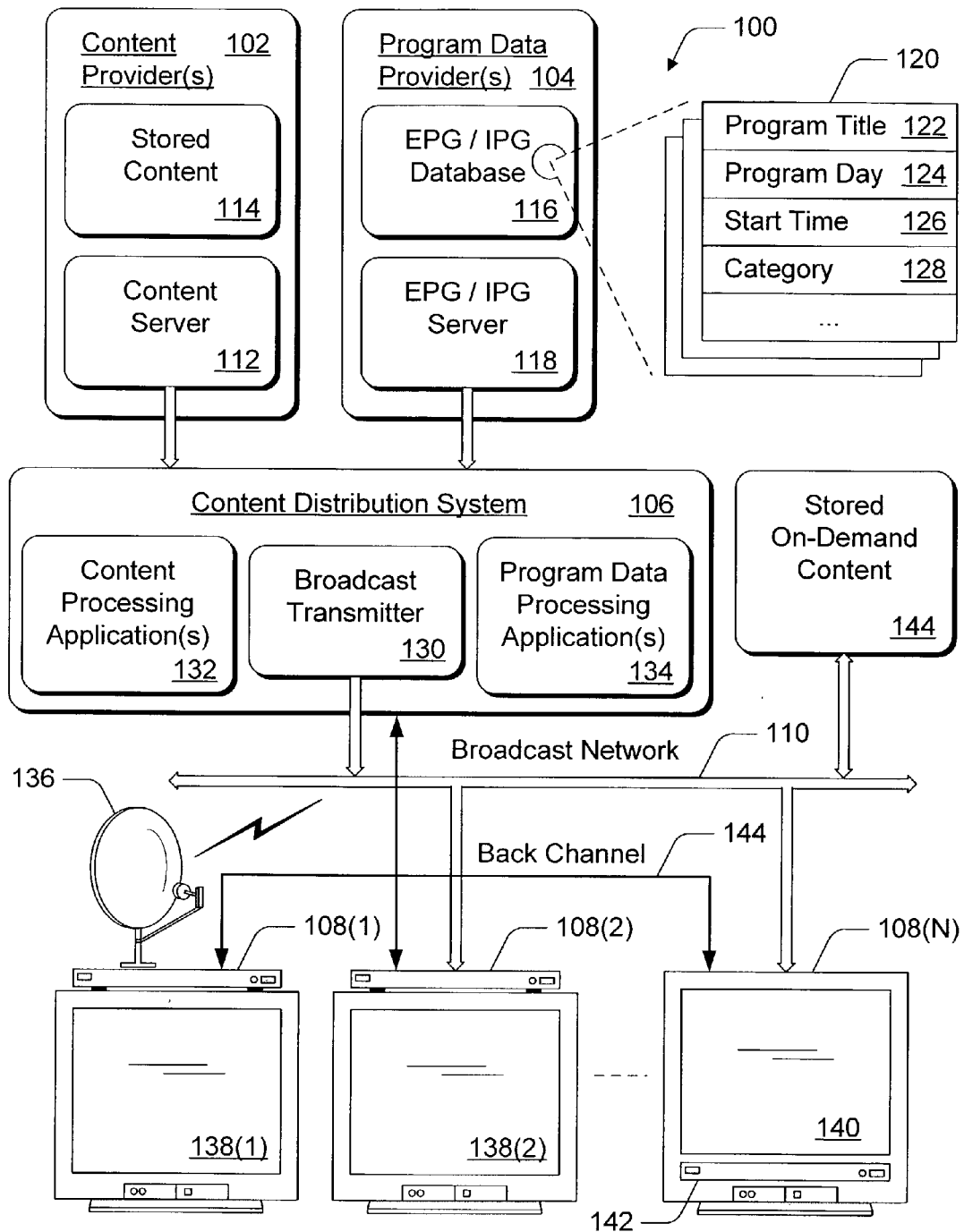
FIG. 1 illustrates an exemplary system architecture in which the systems and methods for program guide data compression can be implemented.

FIG. 1 illustrates an exemplary television entertainment system 100 that is an architecture in which program guide data compression can be implemented. System 100 facilitates distribution of content and program data to multiple viewers, and includes components to further facilitate program guide data compression. The system 100 includes one or more content providers 102, one or more program data providers 104, a content distribution system 106, and multiple client devices 108(1), 108(2), . . . , 108(N) coupled to the content distribution system 106 via a broadcast network 110.

Content provider 102 includes a content server 112 and stored content 114, such as movies, television programs, commercials, music, and similar audio and/or video content. Content server 112 controls distribution of the stored content 114 from content provider 102 to the content distribution system 106. Additionally, content server 112 controls distribution of live content (e.g., content that was not previously stored, such as live feeds) and/or content stored at other locations to the content distribution system 106. Program data provider 104 includes an electronic program guide (EPG) and/or Interactive Program Guide (IPG) database 116 and an EPG and/or IPG server 118. The EPG and/or IPG database 116 stores electronic files of program data which is used to generate an electronic or interactive program guide (or, "program guide").

An electronic file maintains program guide data 120 (or, "EPG data", or "IPG data") that may include a program title 122, program broadcast day(s) 124 to identify which days of the week the program will be shown, program start times(s) 126 to identify a time that the program will be shown on the particular day or days of the week, and a program category 128. A program category describes the genre of a program and categorizes it as a particular program type. For example, a program can be categorized as a movie, a comedy, a sporting event, a news program, a sitcom, a talk show, or as any number of other category descriptions. Program guide data can also include program ratings, characters, descriptions, actor names, station identifiers, channel identifiers, other schedule information, and so on. Additionally, program guide data may include video on-demand content information, such as movie schedules, as well as application information, such as for interactive games, and other programming information that may be of interest to a viewer.

The EPG and/or IPG server 118 processes the program data prior to distribution to generate a published version of the program guide data which can contain programming information for all broadcast channels and on-demand content listings for one or more days. The processing may involve any number of techniques to reduce, modify, or enhance the program guide data. Such processes might include selection of content, content compression, format modification, and the like. The EPG and/or IPG server 118 controls distribution of the published version of the program guide data from program data provider 104 to the content distribution system 106 using, for example, a file transfer protocol (FTP) over a TCP/IP network (e.g., Internet or Intranet). Further, the published version of the program guide data can be transmitted from program data provider 104 via a satellite and the content distribution system 106 directly to a client device 108.

Content distribution system 106 includes a broadcast transmitter 130, one or more content processing applications 132, and one or more program data processing applications 134. Broadcast transmitter 130 broadcasts signals, such as cable television signals, across broadcast network 110. Broadcast network 110 can include a cable television network, RF, microwave, satellite, and/or data network, such as the Internet, and may also include wired or wireless media using any broadcast format or broadcast protocol. Additionally, broadcast network 110 can be any type of network, using any type of network topology and any network communication protocol, and can be represented or otherwise implemented as a combination of two or more networks.

A content processing application 132 processes the content received from content provider 102 prior to transmitting the content across broadcast network 110. Similarly, a program data processing application 134 processes the program guide data received from program data provider 104 prior to transmitting the program guide data across broadcast network 110. A particular content processing application 132 may encode, or otherwise process, the received content into a format that is understood by the multiple client devices 108(1), 108(2), ..., 108(N) coupled to broadcast network 110. Although FIG. 1 shows a single content provider 102, a single program data provider 104, and a single content distribution system 106, exemplary system 100 can include any number of content providers and/or program data providers coupled to any number of content distribution systems.

Content distribution system 106 is representative of a headend service that provides EPG and/or IPG data, as well as content, to multiple subscribers. Each content distribution system 106 may receive a slightly different version of the program guide data that takes into account different programming preferences and lineups. The EPG and/or IPG server 118 can create different versions of an electronic or interactive program guide that includes those channels of relevance to respective headend services, and the content distribution system 106 transmits the electronic or interactive program guide data to the multiple client devices 108(1), 108(2), ..., 108(N). In one implementation, for example, content distribution system 106 utilizes a carousel file system to repeatedly broadcast the program data over an out-of-band (OOB) channel to the client devices 108. Alternatively, the multiple client devices 108(1), 108(2), ..., 108(N) can receive standard, or uniform, program guide data and individually determine the program guide data to display based on the associated headend service.

Client devices 108 can be implemented in a number of ways. For example, a client device 108(1) receives broadcast content from a satellite-based transmitter via a satellite dish 136. Client device 108(1) is also referred to as a set-top box or a satellite receiving device. Client device 108(1) is coupled to a television 138(1) for presenting the content received by the client device (e.g., audio data and video data), as well as a graphical user interface. A particular client device 108 can be coupled to any number of televisions 138 and/or similar devices that can be implemented to display or otherwise render content. Similarly, any number of client devices 108 can be coupled to a single television 138.

Client device 108(2) is also coupled to receive broadcast content from broadcast network 110 and provide the received content to associated television 138(2). Client device 108(N) is an example of a combination television 140 and integrated set-top box 142. In this example, the various components and functionality of the set-top box are integrated into the television, rather than using two separate devices. The set-top box integrated into the television can receive broadcast signals via a satellite dish (similar to satellite dish 136) and/or via broadcast network 110. In alternate implementations, client devices 108 may receive broadcast signals via the Internet or any other broadcast medium, such as back channel 144 which can be implemented as a Internet protocol (IP) connection or as other protocol connections using a modem connection and conventional telephone line, for example. Further, back channel 144 provides an alternate communication link between each of the client devices 108, and between the client devices 108 and the content distribution system 106.

The exemplary system 100 also includes stored on-demand content 144, such as Video On-Demand (VOD) movie content. The stored on-demand content can be viewed with a television 138 via a client device 108 through an onscreen movie guide, for example, and a viewer can enter instructions to stream a particular movie, or other stored content, to a corresponding client device 108.

Exemplary Program Guide Data Compression System

Figure 2:
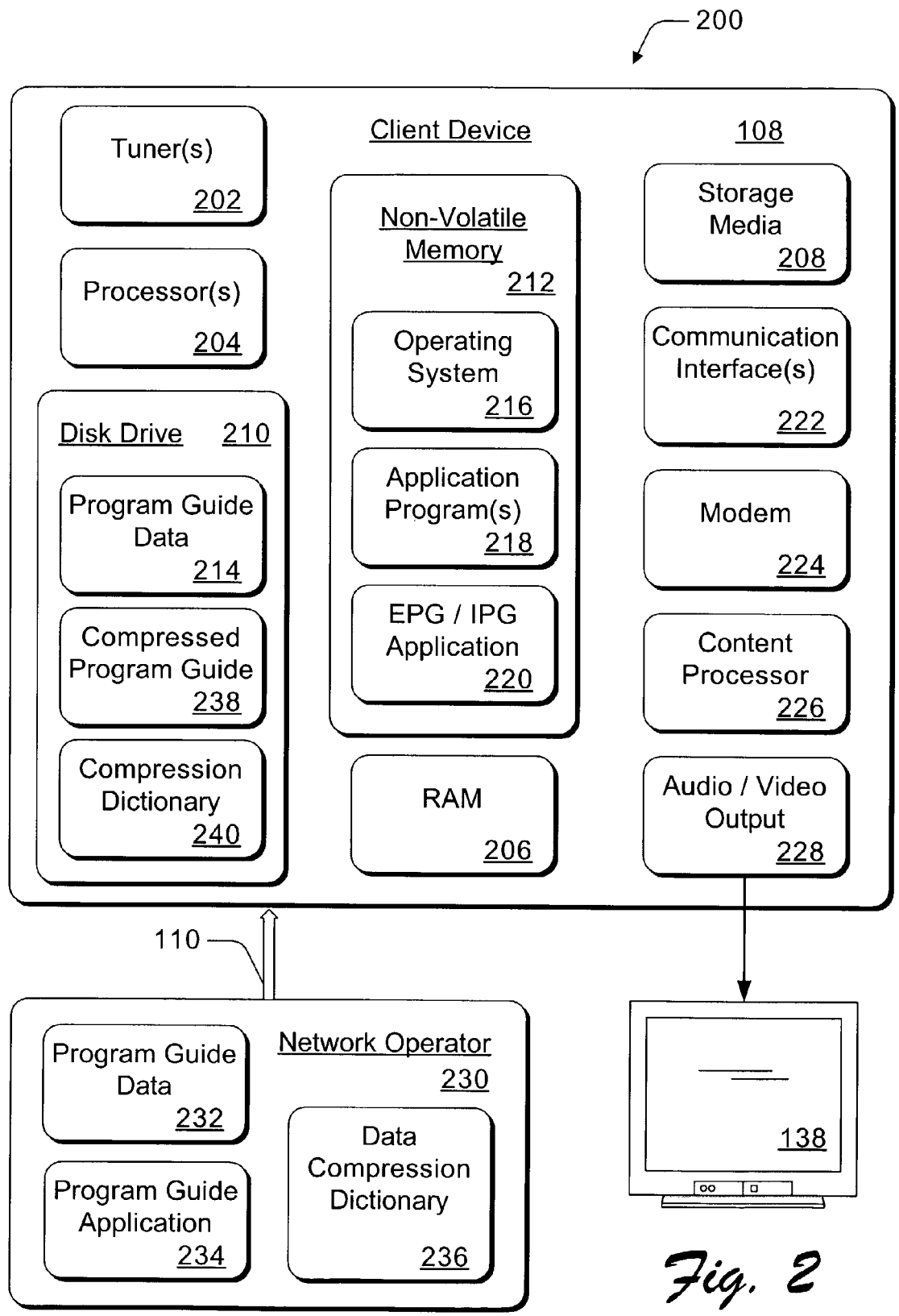
FIG. 2 illustrates various components of an exemplary program guide data compression system.

FIG. 2 illustrates an exemplary program guide data compression system 200 that includes selected components of television system 100, such as an exemplary client device 108 and a television 138. Client device 108 includes components to implement program guide data compression in a television-based entertainment and information system. Client device 108 can be implemented as a set-top box, a satellite receiver, a TV recorder with a hard disk, a digital video recorder (DVR) and playback system, a personal video recorder (PVR) and playback system, a game console, an information appliance, and as any number of similar embodiments.

Client device 108 includes one or more tuners 202 which are representative of one or more in-band tuners that tune to various frequencies or channels to receive television signals, as well as an out-of-band tuner that tunes to the broadcast channel over which the program data is broadcast to client device 108. Client device 108 also includes one or more processors 204 (e.g., microprocessors) which process various instructions to control the operation of client device 108 and to communicate with other electronic and computing devices.

Client device 108 can be implemented with one or more memory components, examples of which include a random access memory (RAM) 206, mass storage media 208, a disk drive 210, and a non-volatile memory 212 (e.g., ROM, Flash, EPROM, EEPROM, etc.). The memory components (e.g., RAM 206, storage media 208, disk drive 210, and non-volatile memory 212) store various information and/or data such as received content, program guide data 214, configuration information for client device 108, and/or graphical user interface information.

Alternative implementations of client device 108 can include a range of processing and memory capabilities, and may include any number and different memory components than those illustrated in FIG. 2. For example, full-resource clients can be implemented with substantial memory and processing resources, including the disk drive 210. Low-resource clients, however, may have limited processing and memory capabilities, such as a limited amount of RAM 206 and limited processing capabilities of a processor 204.

An operating system 216 and one or more application programs 218 can be stored in non-volatile memory 212 and executed on a processor 204 to provide a runtime environment. A runtime environment facilitates extensibility of client device 108 by allowing various interfaces to be defined that, in turn, allow application programs 218 to interact with client device 108. The application programs 218 that may be implemented in client device 108 can include a browser to browse the Web (e.g., "World Wide Web"), an email program to facilitate electronic mail, and so on.

An EPG and/or IPG application 220 is stored in memory 212 to process the program guide data 214 and generate a program guide. A program guide application utilizes the program guide data 214 and enables a television viewer to navigate through an onscreen program guide and locate television shows, video on-demand movies, interactive game selections, and other media access information or content of interest to the viewer. With a program guide application 220, the television viewer can look at schedules of current and future programming, set reminders for upcoming programs, and/or enter instructions to record one or more television shows or video on-demand movies.

Client device 108 further includes one or more communication interfaces 222 and a PSTN, DSL, or cable modem 224. A communication interface 222 can be implemented as a serial and/or parallel interface, as a wireless interface, and/or as any other type of network interface. A wireless interface enables client device 108 to receive input commands and other information from a user-operated input device, such as from a remote control device or from another infrared (IR), 802.11, Bluetooth, or similar RF input device. Input devices can include a wireless keyboard or another handheld input device such as a personal digital assistant (PDA), handheld computer, wireless phone, or the like. A network interface and a serial and/or parallel interface enables client device 108 to interact and communicate with other electronic and computing devices via various communication links. Modem 224 facilitates client device 108 communication with other electronic and computing devices via a conventional telephone line, a DSL connection, or a cable modem.

Client device 108 also includes a content processor and/or decoder 226 to process and decode broadcast video signals, such as NTSC, PAL, SECAM, or other television system analog video signals, as well as a DVB, ATSC, or other television system digital video signals. Content processor 226 can also include a video decoder and/or additional processors to receive, decode, and/or process video content received from content distribution system 106 (FIG. 1) which is representative of a headend service that provides program guide data, as well as content, to multiple client devices 108. Content processor 226 can include an MPEG-2 or MPEG-4 (Moving Pictures Experts Group) decoder that decodes MPEG-encoded video content. MPEG supports a variety of audio/video formats, including legacy TV, HDTV (high-definition television), DVD (digital versatile disc), and five-channel surround sound.

Typically, video content includes video data and audio data that corresponds to the video data. Content processor 226 generates video and/or display content that is formatted for display on display device 138, and generates decoded audio data that is formatted for broadcast by a broadcast device, such as one or more speakers (not shown) in display device 138. Content processor 226 can include a display controller (not shown) that processes the video and/or display content to display corresponding images on display device 138. A display controller can include a microcontroller, integrated circuit, and/or similar video processing component to process the images. Client device 108 also includes an audio and/or video output 228 that provides the video and/or display signals to television 138 or to other devices that process and/or display, or otherwise render, the audio and video data. It is to be noted that the systems and methods described herein can be implemented for any type of encoding format as well as for data and/or content streams that are not encoded.

Although shown separately, some of the components of client device 108 may be implemented in an application specific integrated circuit (ASIC). Additionally, a system bus (not shown) typically connects the various components within client device 108. A system bus can be implemented as one or more of any of several types of bus structures, including a memory bus or memory controller, a peripheral bus, an accelerated graphics port, or a local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

The exemplary program guide data compression system 200 also includes a network operator 230 as an implementation of content distribution system 106 (FIG. 1) which is representative of a headend service that provides program guide data 232, as well as content, to client device 108. Network operator 230 includes a program guide application 234 (e.g., a program data processing application 134 as shown in FIG. 1) implemented to process program guide data 232 as well as implement the program guide data compression techniques described herein.

The program guide application 234 can be implemented as a software component that executes on a processor and is stored in a non-volatile memory device in network operator 230. Although program guide application 234 is illustrated and described as a single application configured to perform several functions of program guide data compression, the program guide application 234 can be implemented as several component applications distributed to each perform one or more functions in a computing device, a digital video recorder system, a personal video recorder system, and/or any other television-based entertainment and information system.

The program guide application 234 generates a data compression dictionary 236 of the words, numbers, and/or combinations of words and numbers found in the program guide data 232. As used herein, "words" defines alphanumeric combinations of letters, numbers, and/or letters and numbers that are positioned next to each other in a string of words and separated by either a space or other punctuation.

The data compression dictionary is generated by the network operator 230 with the program guide application 234 when the network operator generates the program guide data for an arbitrary time period and compresses the program guide data for communication to the client device 108 via broadcast network 110. Client device 108 receives a compressed program guide 238 from network operator 230 and stores the compressed program guide 238 and the associated data compression dictionary 240 in disk drive 210. Although this example describes compressing the program guide data before transmitting the data to reduce transmission bandwidth, client device 108 can also receive program guide data and then to generate the data compression dictionary, as well as compress the program guide data, to reduce the memory storage space needed to maintain, or otherwise store, the program guide data.

Exemplary Program Guide Data Compression

Figure 3:
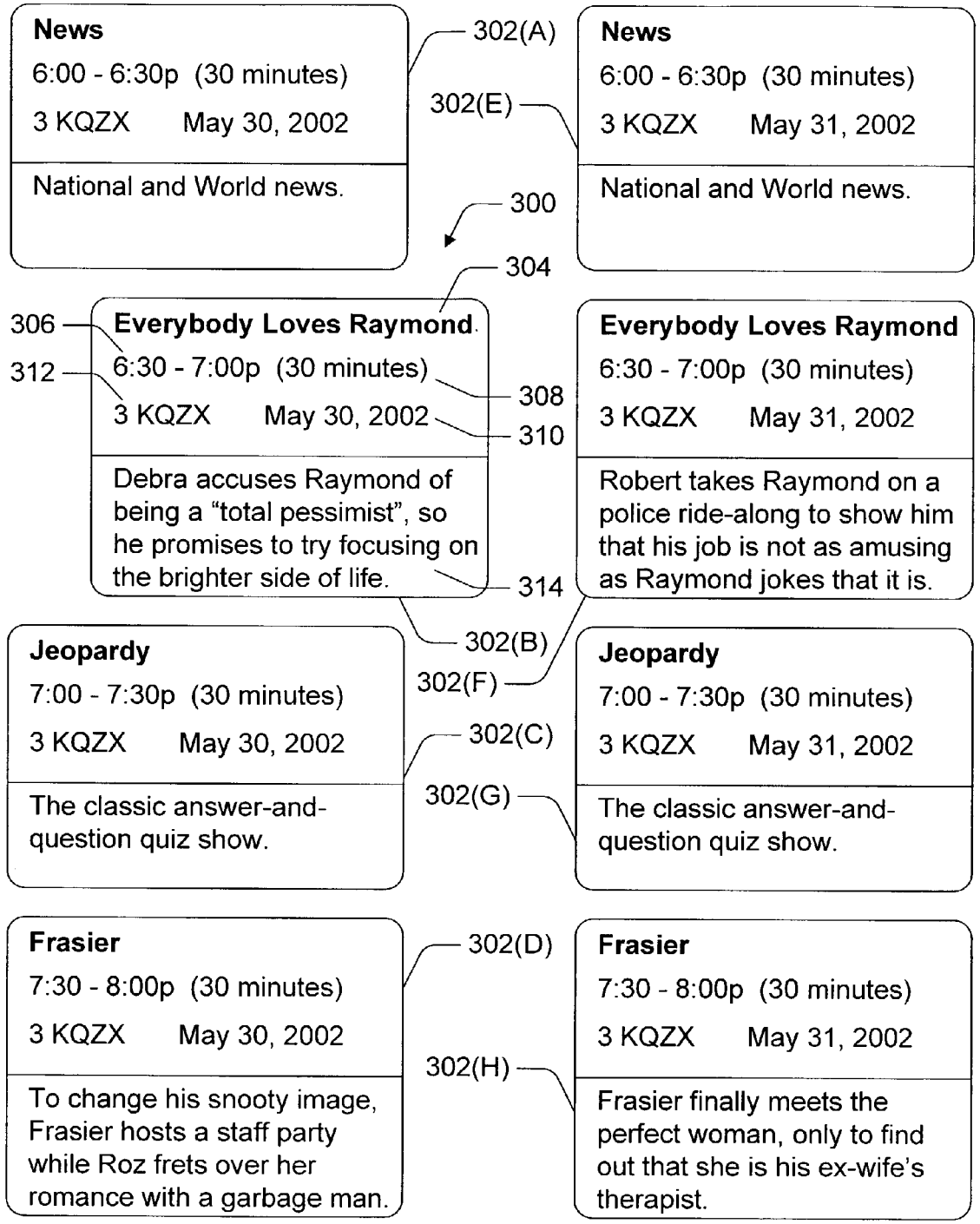
FIG. 3 illustrates exemplary program guide data.

FIG. 3 illustrates exemplary program guide data 300 scheduled for two hours (6:00-8:00p) on one broadcast channel (3 KQZX) for two consecutive days (May 30 and 31, 2002). The exemplary program guide data 300 is used to illustrate an implementation of program guide data compression with reference to FIGS. 4 through 7.

The example program guide data 300 for each program 302(A-H) includes a program title 304, a program start and stop time 306, a time duration 308 of the program, the program broadcast date 310, a channel identification 312 for the program broadcast, and a program description 314. Although not shown, program guide data 300 can also include other related programming information for each program 302. Further, an implementation of program guide data 232 (FIG. 2), such as program guide data 300, can include programming information for any number of hours, for one or more days, and/or for one or more weeks.

The program guide data 300 is maintained in a component memory device, such as disk drive 210 in client device 108 (FIG. 2), and, in this example, is represented as one or more data strings that are encoded with a UTF-8 (Unicode Transformation Format-8) eight-bit encoding scheme. The UTF-8 encoding scheme can be used to encode string data that is represented with ASCII (American Standard Code for Information Interchange) characters, as well as any other Unicode characters. Both the UTF-8 and ASCII encoding schemes use the character values of 0x20 to 0x7F (hex) to represent alphanumeric characters in the program guide data such as letters, numbers, punctuation marks, and common special characters. Additionally, the UTF-8 standard uses the character values 0x80 to 0xFF (hex) to represent a byte that is part of a series of bytes which represent one Unicode character that is not also part of the ASCII standard. A value 0x00 (hex) represents a null terminator to indicate the end of a data string.

In UTF-8 and in ASCII encoding schemes, the values 0x01 to 0x1F (hex) (i.e., the values between 0x00 and 0x20) are commonly used to represent control characters, such as backspace, tab, return, escape, and the like. However, program guide data 300 is encoded as alphanumeric characters with a 0x00 (hex) value to indicate the end of a string and does not include these types of control characters. Therefore, the set of encoding values from 0x01 to 0x1F (hex) are not used to encode program guide data 300.

Figure 4:
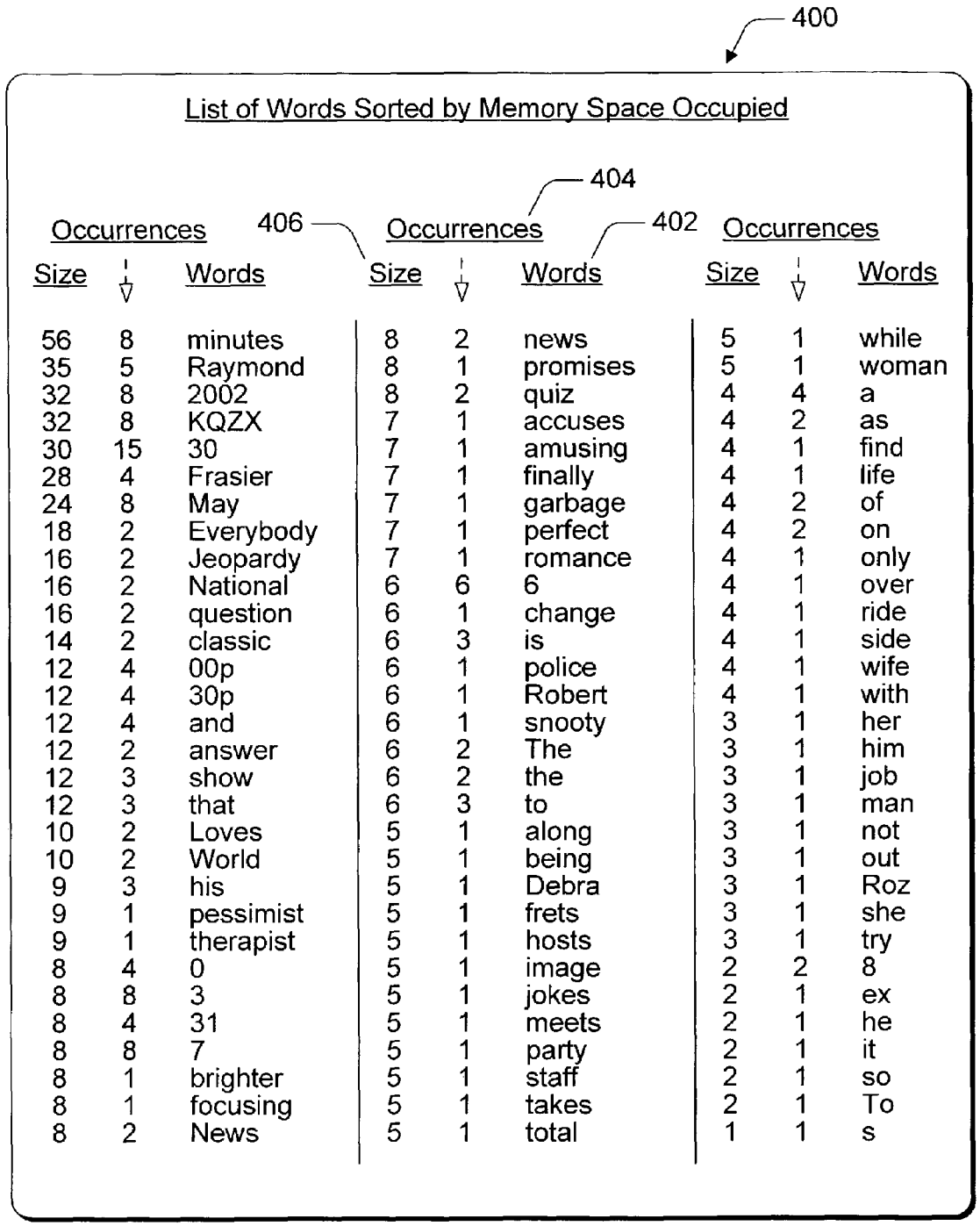
FIG. 4 illustrates a list of words from the exemplary program guide data shown in FIG. 3 sorted according to memory space occupied.

FIG. 4 illustrates a list of the words 400 (to include combinations of numbers and/or letters and numbers) from the example program guide data 300 (FIG. 3) sorted according to which of the words occupy the most memory space when maintained with a memory component. The list of words 400 includes three column lists of words 402, a number of occurrences 404 that identifies the number of times that a corresponding word 402 occurs in the program guide data 300, and a size 406 which is the total memory space occupied by the corresponding word as determined by a product of the number of times that a word occurs in the program guide data and a length of the word.

For example, the word "news" (at the top of the $2^{nd}$ column in the list of words 400) occurs in the program guide data 300 twice as identified by the corresponding "2" occurrences 404. The corresponding size 406 (i.e., the memory space occupied) to maintain two occurrences of the word "news" is "8". The size 1406 of "8" is determined by multiplying the number of occurrences of the word by the length of the word (e.g., the number of alphanumeric characters), which in this example is determined by 2×4=8. For an eight-bit encoding scheme such as UTF-8, each alphanumeric character is represented in memory with eight bits (for the English language, but can be represented by more than eight bits for a language other than English). Therefore, eight letters (i.e., twice each of "n", "e", "w", and "s") are represented in memory with sixty-four bits, or eight bytes (i.e., 8 letters×8 bits each).

The word "news" appears once each in programs 302(A) and 302(E) (FIG. 3) in the program descriptions "National and World news". A capitalized version of the word "News" also appears once each in the programs 302(A) and 302(E). In this program guide data compression example, a capitalized version of a word is identified separately in the list of words 400 (FIG. 4). For example, the word "News" (at the bottom of the $1^{st}$ column in the list of words 400) occurs in the program guide data 300 twice as identified by the corresponding "2" occurrences. The corresponding size of memory space occupied to maintain two occurrences of the word "News" is also "8" which is sixty-four bits, or eight bytes in memory.

The word "minutes" (at the top of the $1^{st}$ column in the list of words 400) occupies the most memory space with a size of "56" as determined by eight occurrences of the word in the program guide data 300 multiplied by the seven letter length of the word. The word "minutes" appears once in each of the eight programs 302(A-H) (FIG. 3). It should be noted that the word occurring most often in program guide data 300 is "30" ($5^{th}$ entry in the $1^{st}$ column in the list of words 400) which occurs "15" times, but that "30" does not occupy the most memory space because the word length is only two characters which is equivalent to a size of "30" (i.e., 15 occurrences of the word×2 letters each).

FIG. 5 illustrates a list of words 500 from the example program guide data 300 that will be included in a data compression dictionary. The list of words 500 are the words 502 that remain from the list of words 400 (FIG. 4) after any words that are two characters or less are omitted, and after any words that occur in the program guide data 300 only once are omitted. The list of words 500 includes the words 502, a number of occurrences 504 of a corresponding word in the program guide data 300, and a size 506 of the word.

Figure 6:
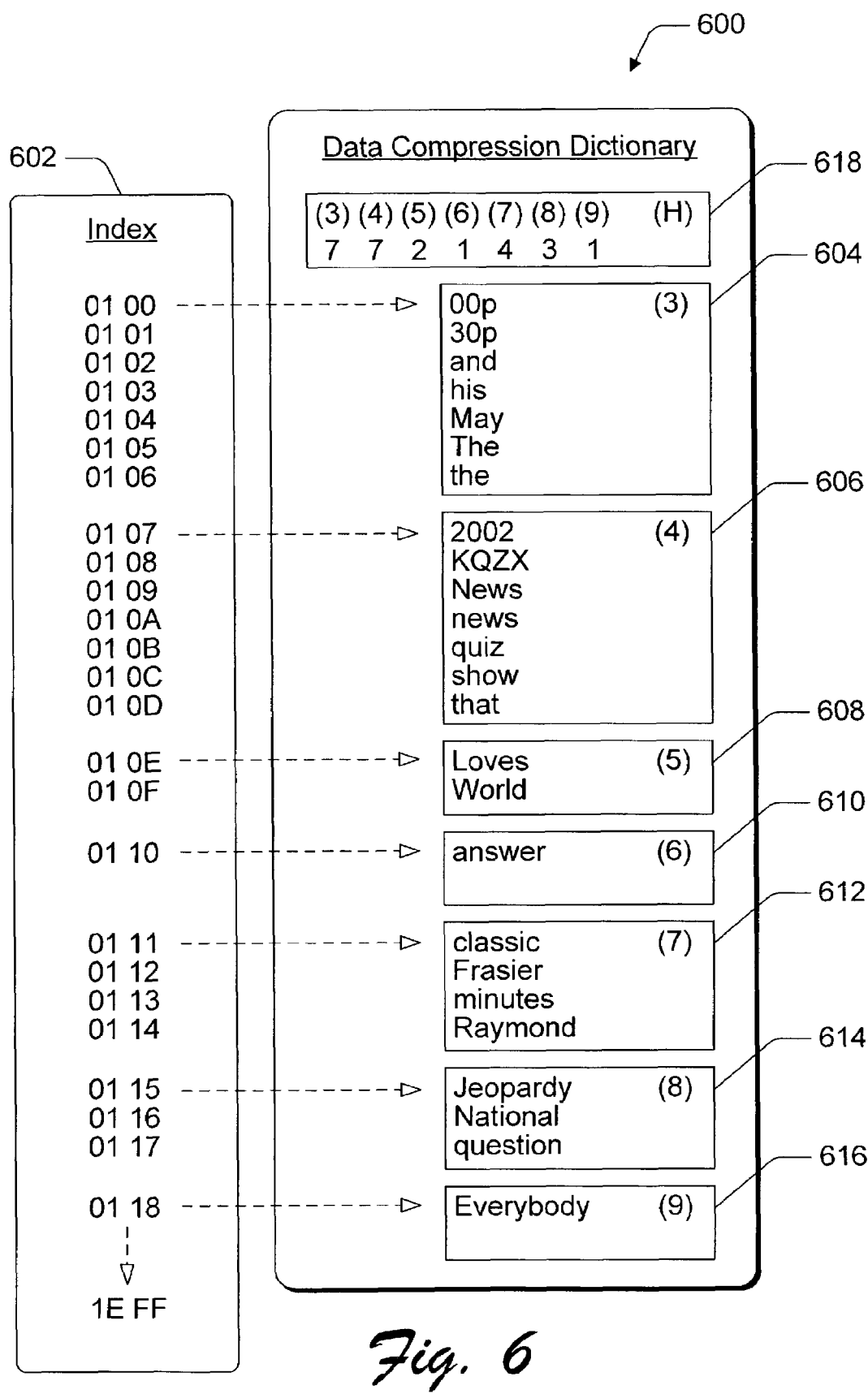
FIG. 6 illustrates a data compression dictionary for the exemplary program guide data shown in FIG. 3, and a dictionary index to reference the words included in the data compression dictionary.

FIG. 6 illustrates a data compression dictionary 600 which includes the list of words 500 (FIG. 5) from the example program guide data 300. FIG. 6 also illustrates a dictionary index 602 to reference the words included in the data compression dictionary 600. The list of words 500 are sorted in the data compression dictionary 600 according to the length of each word such that words 502 of the same length are grouped together alphabetically. Data compression dictionary 600 includes a group 604 of three-letter words, a group 606 of four-letter words, a group 608 of five-letter words, a group 610 of six-letter words, a group 612 of seven-letter words, a group 614 of eight-letter words, and a group 616 of nine-letter words (although in this example, groups 610 and 616 only include one word each). Additionally, each group of words that are of the same length are sorted alphabetically within the respective group.

Data compression dictionary 600 also includes a dictionary header 618 which identifies the number of words of the same length that are grouped together in each of the word groups 604-616. In this example, dictionary header 618 includes information to indicate that the three-letter word group 604 has seven (7) words, the four-letter word group 606 has seven (7) words, the five-letter word group 608 has two (2) words, the six-letter word group 610 has one (1) word, the seven-letter word group 612 has four (4) words, the eight-letter word group 614 has three (3) words, and the nine-letter word group 616 has one (1) word.

Dictionary index 602 includes thirteen-bit index values that reference the individual words in the data compression dictionary 600. The individual index values are generated with the set of unused encoding values 0x01 to 0x1E (hex) (represented with five bits each) in combination with an eight-bit value from 0x00 to 0xFF (hex). In this example, data compression dictionary 600 can include 7,680 individual words which is 0100 to 1EFF (hex) (i.e., 30 (0x01 to 0x1E hex) multiplied by 256 (0x00 to 0xFF hex)). It should be noted that, in this example, the index values 602 are not included as data in the data compression dictionary 600. Rather, dictionary index 602 is shown only to illustrate how the dictionary index values correspond to the individual words included in the data compression dictionary.

Although the program guide data used to generate a data compression dictionary may include more than 7,680 individual words after any words that are two characters or less are omitted, and after any words that occur in the program guide data only once are omitted, the 7,680 words that will be included in the data compression dictionary 600 will be the words that occupy the most memory space as described with reference to FIGS. 4 and 5, and thus provides the most compression benefit. Any words from the program guide data that could be included in the data compression dictionary, but are omitted because data compression dictionary capacity has been reached will be the words that occupy the least amount of memory space and thus provide the least compression benefit.

Figure 7:
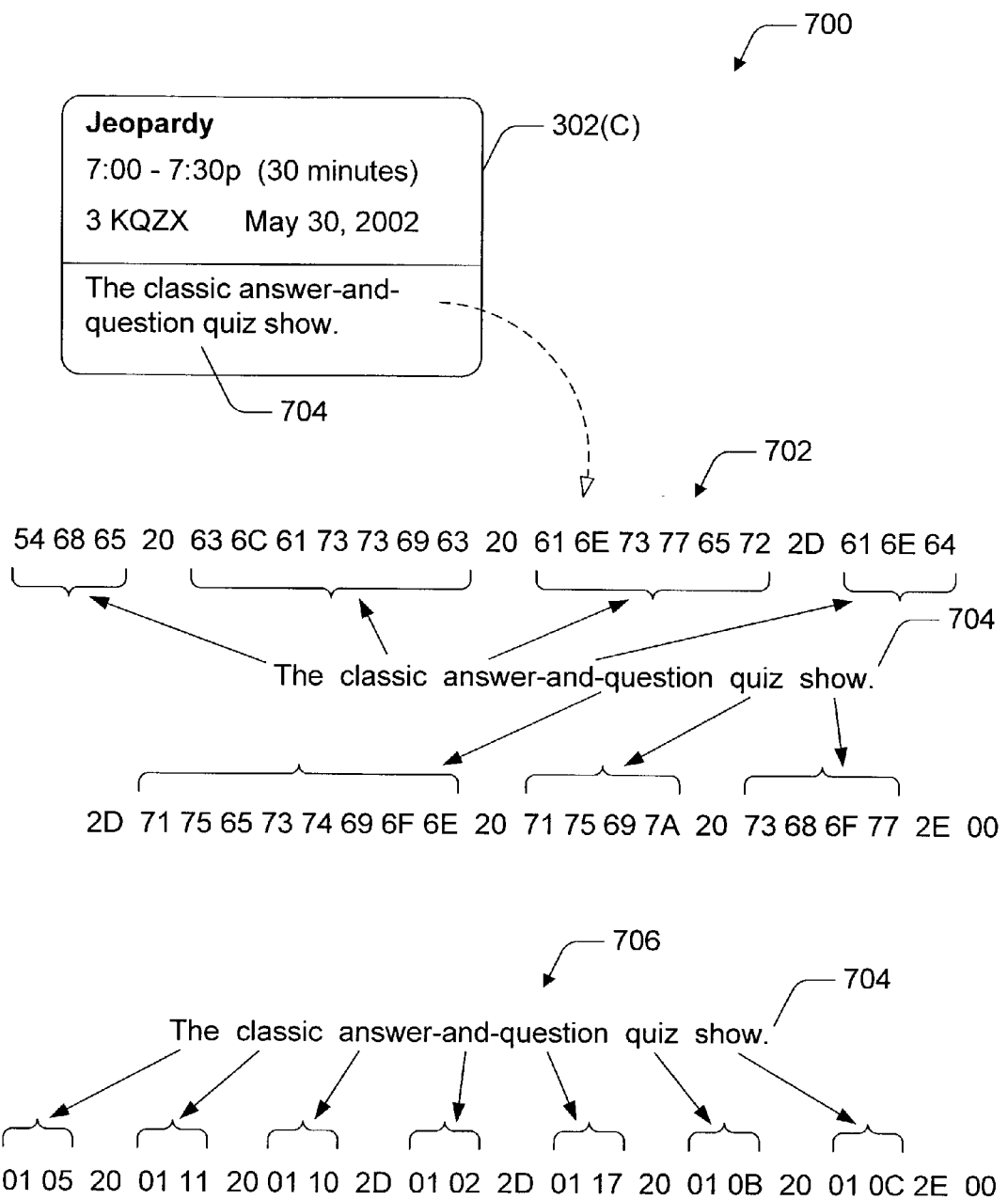
FIG. 7 illustrates an example of program guide data compression.

FIG. 7 illustrates an example of program guide data compression 700. A first example 702 shows UTF-8 encoding of a portion of the program guide data for program 302(C) (also shown in FIG. 3). Each character of a program description data string 704 is represented in memory with eight bits when encoded according to the following ASCII chart:

|   | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0 | nul | soh | stx | etx | eot | enq | ack | bel | bs | ht | lf | vt | ff | cr | so | si |
| 1 | dle | dc1 | dc2 | dc3 | dc4 | nak | syn | etb | can | em | sub | esc | fs | gs | rs | us |
| 2 | sp | ! | " | # | $ | % | & | ' | ( | ) | * | + | , | - | . | / |
| 3 | 0 | 1 | 2 | 3 | 4 | 5 | 6 | 7 | 8 | 9 | : | ; | < | = | > | ? |
| 4 | @ | A | B | C | D | E | F | G | H | I | J | K | L | M | N | O |
| 5 | P | Q | R | S | T | U | V | W | X | Y | Z | [ | \ | ] | ^ | _ |
| 6 | ` | a | b | c | d | e | f | g | h | i | j | k | l | m | n | o |
| 7 | p | q | r | s | t | u | v | w | x | y | z | { | | | } | ~ | del |

To encode each character of the program description data string 704 with a UTF-8 encoding scheme, forty-three (43) encoding values are required which is forty-three (43) bytes or 344 bits.

A second example 706 shows program guide data compression of the program description data string 704. Rather than using eight bits to represent each character of the program description data string 704 in memory, index values corresponding to words in the data compression dictionary 600 (FIG. 6) are used to compress the data string on a word-by-word basis. The thirteen-bit index values that reference the individual words in the data compression dictionary 600 are converted to sixteen-bit values to represent the words in the data string. To encode the example program description data string 704 with the data compression dictionary 600 index values, twenty-two (22) encoding index values are used which is twenty-two bytes (22) or 176 bits. In this example, the program description data string 704 is compressed approximately 51% with program guide data compression.

As described above, the word "news" appears once each in the program description for programs 302(A) and 302(E) (FIG. 3), and a capitalized version of the word "News" also appears once each in the program title for programs 302(A) and 302(E). The capitalized and non-capitalized versions of the word are each included in the data compression dictionary 600 (FIG. 6). In an alternate implementation, variations of a base word can be identified using the bits of token values which represent the words in a data string, and the dictionary can be condensed by including only the base word. A token value can be a sixteen-bit value, as described above, or may be a thirty-two bit value, or any other sized token value. For example, a base word such as "boat" can be included in the data compression dictionary 600 and variations of the word, such as the plural "boats", a capitalized version "Boat", and a capitalized plural version "Boats" can all be represented in a compressed program guide with thirty-two bit values that represent the words in a data string.

If the word "boat" was included in data compression dictionary 600, the word would be included in the group 606 of four-letter words and, in alphabetical order, would have the thirteen-bit index value of 01,08 (hex) which appears between the words "2002" and "KQZX". When the thirteen-bit index value is converted to a thirty-two bit value to represent the word "boat" in a data string, the token value can include a bit or bits allocated to indicate variations of the word. For example:

| Word  | Dictionary Index | Token Value | Indicates                                 |
|-------|------------------|-------------|-------------------------------------------|
| boat  | 01,08            | 0x00000008  | base word                                 |
| Boat  | 01,08            | 0x40000008  | up-case first letter                      |
| boats | 01,08            | 0x80000008  | concatenate 's'                           |
| Boats | 01,08            | 0xC0000008  | up-case first letter & concatenate 's'    |
| boat. | 01,08            | 0x20000008  | concatenate '.'                           |

This example also illustrates that punctuation can be included in the compression scheme when adding a period ('.') to the base word "boat" and converting the token value to indicate that "boat" is the end of a sentence in the data string (i.e., "boat."). This implementation can include any other punctuation as well, such as "boat/", "boat,", "boat?", and the like.

Methods for Program Guide Data Compression

Methods for program guide data compression may be described in the general context of computer-executable instructions performed by a program guide application in network operator 230 and/or client device 108. Generally, computer-executable instructions include routines, programs, objects, components, data structures, and the like that perform particular functions or implement particular abstract data types Methods for program guide data compression may also be practiced in distributed computing environments where functions are performed by remote processing devices that are linked through a communications to network. In a distributed computing environment, computer-executable instructions may be located in both local and remote computer storage media, including memory storage devices.

Figure 8:
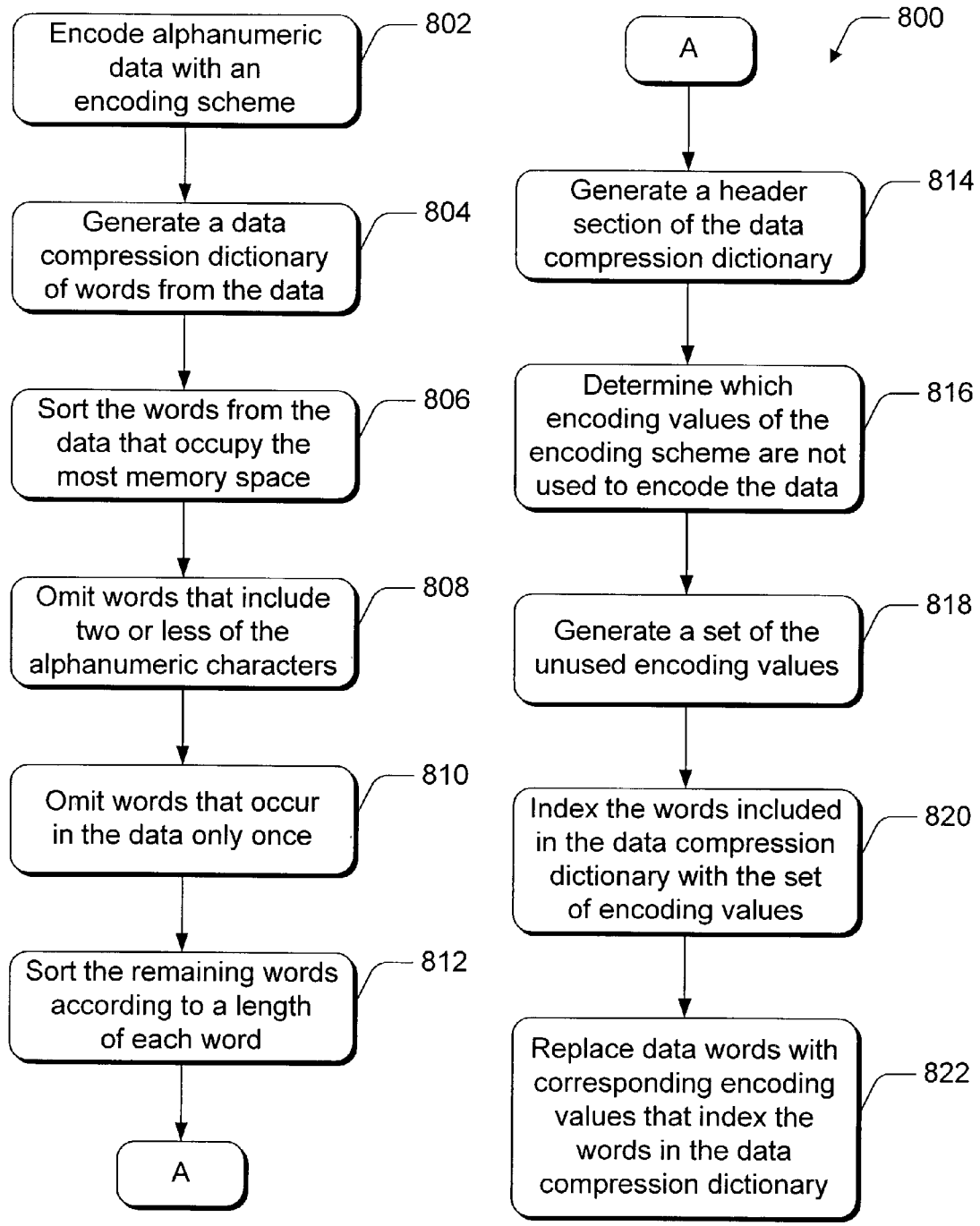
FIGS. 8 and 9 are flow diagrams that illustrate methods for program guide data compression.

FIG. 8 illustrates a method 800 for program guide data compression. The order in which the method is described is not intended to be construed as a limitation, and any number of the described method blocks can be combined in any order to implement the method. Furthermore, the method can be implemented in any suitable hardware, software, firmware, or combination thereof.

At block 802, alphanumeric characters of data strings are encoded with an encoding scheme. For example, program guide data 300 (FIG. 3) is encoded with UTF-8 or ASCII encoding schemes both of which use the character values of 0x20 to 0x7F (hex) to represent alphanumeric characters in program guide data. At block 804, a data compression dictionary of words is generated from words in the data. For example, the program guide application 234 (FIG. 2) generates data compression dictionary 236 which is a reference list of words that are combinations of letters, numbers, and/or letters and numbers.

The data compression dictionary can be generated at block 804 to include a base word that corresponds to two or more words from the program guide data. For example, in the described implementation, data compression dictionary 600 includes both the words "news" and "News". Alternatively, the data compression dictionary 600 can be generated to include only the base word "news" and the token value index generated from dictionary index 602 can have a bit allocated to identify a variation of the word "news" in the program guide data, such as the word "News".

Generating the data compression dictionary at block 804 includes sorting the words from the data according to the words that occupy the most memory space at block 806. The words that occupy the most memory space are determined by a product of a number of times that a word occurs in the data and a length of the word. Generating the dictionary also includes omitting words that include two or less of the alphanumeric characters at block 808, and omitting words that occur in the data only once at block 810.

Further, generating the dictionary includes sorting the remaining words from the data according to a length of each word such that words of the same length are grouped together alphabetically at block 812. For example, program guide application 234 generates data compression dictionary 600 which includes groups of words 604-616 wherein words that are of the same length are sorted alphabetically within the respective group. Generating the dictionary also includes generating a header section of the dictionary at block 814. For example, program guide application 234 generates the header section 618 of data compression dictionary 600 to include the number of words of the same length that are grouped together in each of one or more word groups 604-616.

At block 816, it is determined which encoding values of the encoding scheme are not used to encode the data, and at block 818, a set of encoding values is generated from the encoding values that are not used. For example, program guide application 234 can be implemented to determine that encoding values 0x01 to 0x1F (hex) from the UTF-8 encoding scheme are not used to encode program guide data. It should be noted that this determination of unused encoding values can be by convention, such as with program guide data that does not use specific encoding values, or can be determined each time that a data compression dictionary is generated by scanning the encoded data and determining which encoding values of the encoding scheme are not used for a particular data compression dictionary.

At block 820, the words included in the data compression dictionary are indexed with the set of encoding values. For example, the words in data compression dictionary 600 are indexed with index values 602 which are the 1 unused encoding values 0x01 to 0x1E (hex) in combination with a second value from 0x00 to 0xFF (hex).

At block 822, one or more words in the data are replaced to compress the data. The words in the data are replaced with a corresponding encoding value that indexes the word in the dictionary. For example, program guide application 234 begins compressing the data from the beginning of the program guide data 232 to generate the compressed program guide 238 which is then communicated from network operator 230 to client device 108 (FIG. 3). Replacing the words in the program guide data includes replacing a first word with a corresponding encoding value that indexes the first word in the dictionary, and replacing a second word in the program guide data with an encoding value generated from the corresponding encoding value where the second word is a variation of the first word.

The program guide application 234 parses a word string in the program guide data 232 to determine individual words which are identified by groups of letters, numbers, and/or a combination of letters and numbers separated by a space or other punctuation. The program guide application 234 then executes a routine to lookup a word in the data compression dictionary 600 and retrieve an encoding value index 602 corresponding to the word which is stored as two consecutive bytes in an output compressed string.

To lookup the word in the data compression dictionary 600, a length of the word (in bytes) is determined. The program guide application 234 then references dictionary header 618 and multiplies the length of words in a particular group by the number of words in the group and continues adding consecutive word group calculations until the group of words having a length equivalent to the length of the word to be compressed is determined. This provides an index offset into the data compression dictionary word list to the group of words having the same length as the word to be compressed.

The words in the word group are then searched linearly for a character match, and because the words are in alphabetical order, the search for a matching word can be stopped when past a point in the dictionary where the word would be found. An index count is incremented as the word group is searched for a character match of the word, and if the word match is determined, then the index count is returned. If the word is not found in the data compression dictionary, then the word itself is stored in the compressed output string.

If the second byte of the index count is zero, such as for the index values of 0100, 0200, etc. up to 1E00 (hex), then the first byte is set to a value of 0x1F and the second byte is set to the value of what the first byte was. For example, an index value of 0200 (hex) would be converted to 1F02 (hex). This avoids having the second byte being confused with an end-of-string marker (i.e., a null-terminator 0x00 in the compressed data string). This two-byte encoded value index is then stored in the output string to replace the original word.

Figure 9:
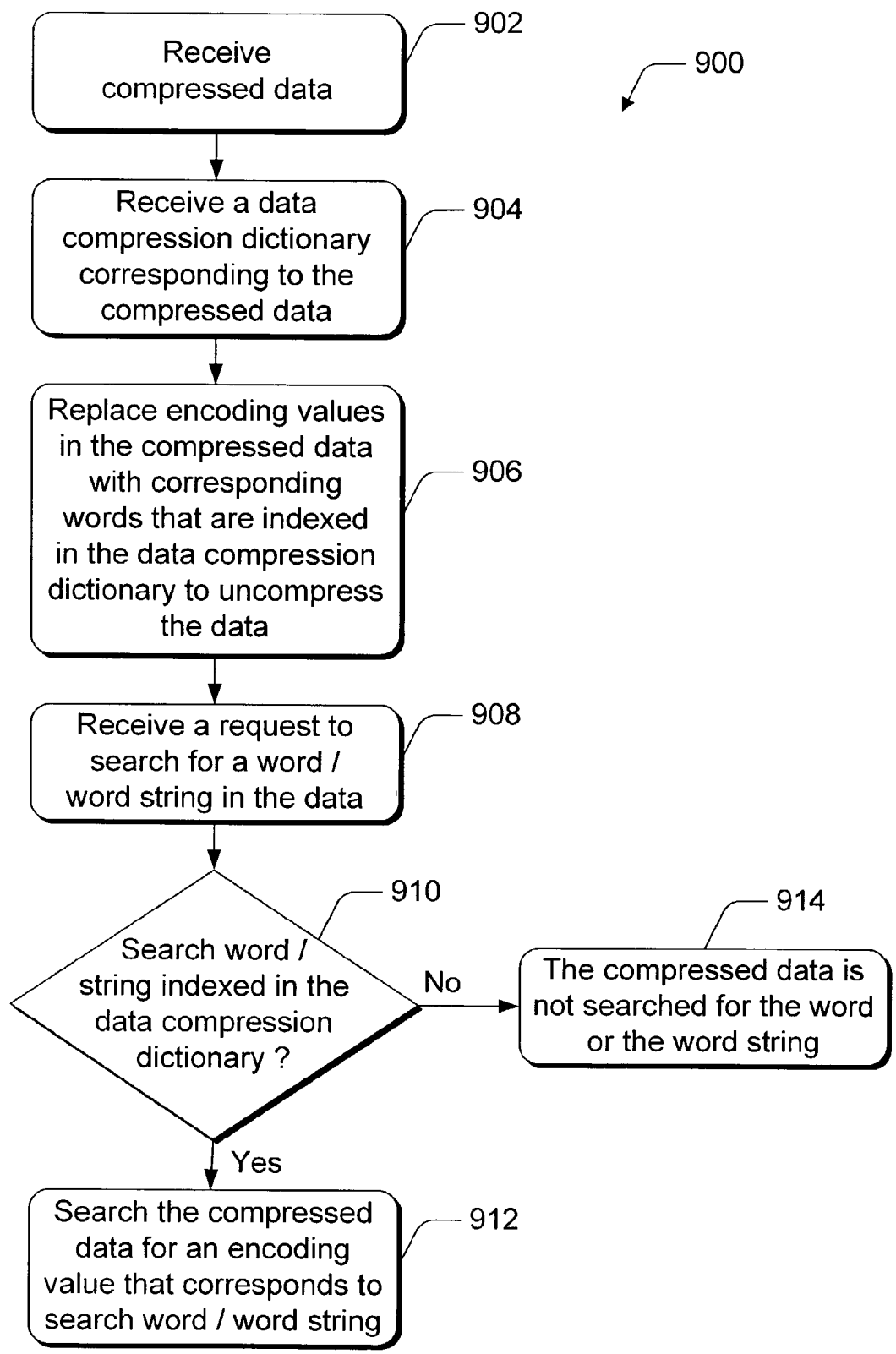

FIG. 9 illustrates a method 900 for program guide data compression. The order in which the method is described is not intended to be construed as a limitation, and any number of the described method blocks can be combined in any order to implement the method. Furthermore, the method can be implemented in any suitable hardware, software, firmware, or combination thereof.

At block 902, compressed data is received which includes data encoded with an encoding scheme. At block 904, a data compression dictionary of words generated from the data is received. The words in the data compression dictionary are indexed with a set of encoding values derived from the encoding scheme. For example, client device 108 (FIG. 2) receives data compression dictionary 240 and also receives compressed program guide 238 which includes program guide data encoded with a UTF-8 encoding scheme. Client device 108 receives the compressed program guide 238 and the data compression dictionary 240 from network operator 230, and the client device stores the compressed program guide and associated dictionary in disk drive 210.

The data compression dictionary received at block 904 is received with the words that occupy the most memory space as determined by a product of a number of times that a word occurs in the data and a length of the word, and is sorted according to a length of each word such that words of the same length are grouped together alphabetically. The dictionary is also received with a header section that includes the number of words of the same length that are grouped together in each of one or more alphabetized word groups At block 906, one or more of the encoding values in the compressed data is replaced to uncompress the data. Each of the one or more encoding values is replaced with a corresponding word indexed in the data compression dictionary. To uncompress the data for example, program guide application 220 in client device 108 examines the compressed data for encoding values in the range of 0x01 to 0x1F (hex) and passes the values to a routine which executes to determine a corresponding word in the data compression dictionary 600 and return the word to be added to an uncompressed data string.

If an encoding value has a first byte of 0x1F (hex) to indicate that the second byte of the encoding value is 0x00 (hex) in the dictionary index 602, then the first byte is replaced with the value of the second byte, and the second byte is set to the value of 0x00. For example, if an encoded value that represents a word in the compressed data is 1F02 (hex), then the encoded value is converted to the index value of 0200 (hex).

The program guide application 220 then references dictionary header 618 and calculates the total number of words in the dictionary by adding the number of words for each word group, and also calculates the total number of bytes for the word groups until determining the offset into the dictionary word group corresponding to the encoded value. The number of words in a particular word group are added to the total number of words determined to locate the encoded value index, and the corresponding word in the data compression dictionary is returned to replace the encoded value in the uncompressed data string.

At block 908, a request is received to search for a word or a word string in the data. At block 910, it is determined from the data compression dictionary whether the search word or word string is indexed with a corresponding encoding value. If the search word or word string is indexed in the data compression dictionary (i.e., "yes" from block 910), then, at block 912, the compressed data is searched for an encoding value that corresponds to a particular word indexed in the dictionary with the encoding value, or for a combination of encoding values that correspond to a word string which includes words indexed in the dictionary with the encoding values. If the search word or word string is not indexed in the data compression dictionary (i.e., "no" from block), the compressed data is not searched for the word or word string. For example, program guide application 220 in client device 108 can receive a viewer-request to display a program description, and determine a word or a string of words to search for in the compressed data.

CONCLUSION

Although the invention has been described in language specific to structural features and/or methods, it is to be understood that the invention defined in the appended claims is not necessarily limited to the specific features or methods described. Rather, the specific features and methods are disclosed as preferred forms of implementing the claimed invention.

The invention claimed is:

1. A method for program guide data compression, comprising:

encoding alphanumeric characters of program guide data with an encoding scheme;

generating a dictionary of words from the program guide data, wherein generating the dictionary includes sorting the words from the program guide data according to memory space occupied by the words as determined by a product of a number of times that a word occurs in the program guide data and a length of the word;

indexing the words in the dictionary with a set of encoding values which are part of the encoding scheme; and replacing one or more words in the program guide data to form a compressed program guide, each of the one or more words being replaced with a corresponding encoding value that indexes the word in the dictionary.

2. A method for program guide data compression as recited in claim 1, wherein encoding includes encoding the alphanumeric characters of the program guide data with a UTF-8 (Unicode Transformation Format-8) encoding scheme.

3. A method for program guide data compression as recited in claim 1, wherein encoding includes encoding the alphanumeric characters of the program guide data with an ASCII (American Standard Code for Information Interchange) encoding scheme.

4. A method for program guide data compression as recited in claim 1, wherein generating includes generating the dictionary of words that include at least one of a combination of letters, a combination of numbers, and a combination of letters and numbers.

5. A method for program guide data compression as recited in claim 1, wherein generating includes generating the dictionary of words that include three or more alphanumeric characters and that are at least one of letters, numbers, and a combination of letters and numbers.

6. A method for program guide data compression as recited in claim 1, wherein generating the dictionary includes sorting the words from the program guide data according to a length of each word such that words of the same length are grouped together alphabetically.

7. A method for program guide data compression as recited in claim 1, wherein generating the dictionary includes omitting words that include two or less of the alphanumeric characters.

8. A method for program guide data compression as recited in claim 1, wherein generating the dictionary includes omitting words that occur in the program guide data only once.

9. A method for program guide data compression as recited in claim 1, wherein generating the dictionary includes omitting words that include two or less of the alphanumeric characters, and omitting words that occur in the program guide data only once.

10. A method for program guide data compression as recited in claim 1, wherein generating the dictionary includes generating a header section of the dictionary that includes the number of words of the same length that are grouped together in each of one or more word groups.

11. A method for program guide data compression as recited in claim 1, wherein indexing includes indexing the words in the dictionary with the set of encoding values which are not used to encode the alphanumeric characters of the program guide data.

12. A method for program guide data compression as recited in claim 1, further comprising determining which encoding values of the encoding scheme are not used to encode the alphanumeric characters of the program guide data, and generating the set of encoding values from the encoding values that are not used.

13. A method for program guide data compression as recited in claim 1, wherein generating includes generating the dictionary to include a base word that corresponds to two or more words from the program guide data.

14. A method for program guide data compression as recited in claim 1, wherein replacing includes:
replacing a first word in the program guide data with a corresponding encoding value that indexes the first word in the dictionary; and
replacing a second word in the program guide data with an encoding value generated from the corresponding encoding value, the second word being a variation of the first word.

15. A method for program guide data compression as recited in claim 1, wherein generating includes generating the dictionary to include a base word that corresponds to two or more words from the program guide data, and wherein replacing includes replacing a second word in the program guide data with an encoding value generated from an encoding value corresponding to the base word, the second word being a variation of the base word.

16. One or more computer-readable media storing computer-executable instructions that, when executed by a processor, direct a digital video recording system to perform the method of claim 1.

17. One or more computer-readable media storing computer-executable instructions that, when executed by a processor, direct a computing device to perform the method of claim 1.

18. A program guide data compression system, comprising:
a memory device configured to maintain program guide data encoded with an encoding scheme;
a program guide application configured to perform acts comprising:
generating a dictionary of words from the program guide data;
sorting the words in the dictionary according to a length of each word such that words of the same length are grouped together alphabetically;
indexing the words in the dictionary with a set of encoding values which are part of the encoding scheme; and
replacing one or more words in the program guide data to form a compressed program guide, each of the one or more words being replaced with a corresponding encoding value that indexes the word in the dictionary.

19. A program guide data compression system as recited in claim 18, wherein the memory device maintains the program guide data encoded with a UTF-8 (Unicode Transformation Format-8) encoding scheme.

20. A program guide data compression system as recited in claim 18, wherein the memory device maintains the program guide data encoded with an ASCII (American Standard Code for Information Interchange) encoding scheme.

21. A program guide data compression system as recited in claim 18, wherein the program guide application is further configured to generate the dictionary of words that include at least one of a combination of letters, a combination of numbers, and a combination of letters and numbers.

22. A program guide data compression system as recited in claim 18, wherein the program guide application is further configured to generate the dictionary of words that include three or more alphanumeric characters and that are at least one of letters, numbers, and a combination of letters and numbers.

23. A program guide data compression system as recited in claim 18, wherein the program guide application is further configured to sort the words in the dictionary according to memory space occupied by the words as determined by a product of a number of times that a word occurs in the program guide data and a length of the word.

24. A program guide data compression system as recited in claim 18, wherein the program guide application is further configured to omit words that include two or less characters.

25. A program guide data compression system as recited in claim 18, wherein the program guide application is further configured to omit words that occur in the program guide data only once.

26. A program guide data compression system as recited in claim 18, wherein the program guide application is further configured to omit words that include two or less characters, and omit words that occur in the program guide data only once.

27. A program guide data compression system as recited in claim 18, wherein the program guide application is further configured to generate a header section of the dictionary that includes the number of words of the same length that are grouped together in each of one or more word groups.

28. A program guide data compression system as recited in claim 18, wherein the program guide application is further configured to index the words in the dictionary with the set of encoding values which are not used to encode the program guide data.

29. A program guide data compression system as recited in claim 18, wherein the program guide application is further configured to determine which encoding values of the encoding scheme are not used to encode the program guide data, and generate the set of encoding values from the encoding values that are not used.

30. A program guide data compression system as recited in claim 18, wherein the program guide application is further configured to generate the dictionary of words to include a base word that corresponds to two or more words from the program guide data.

31. A program guide data compression system as recited in claim 18, wherein the program guide application is further configured to replace a first word in the program guide data with a corresponding encoding value that indexes the first word in the dictionary, and replace a second word in the program guide data with an encoding value derived from the corresponding encoding value, the second word being a variation of the first word.

32. A program guide data compression system as recited in claim 18, wherein the program guide application is further configured to generate the dictionary of words to include a base word that corresponds to two or more words from the program guide data, and replace a second word in the program guide data with an encoding value derived from an encoding value corresponding to the base word in the dictionary of words, the second word being a variation of the base word.

33. A television-based entertainment system comprising the program guide data compression system as recited in claim 18.

34. A video recording system comprising the program guide data compression system as recited in claim 18.

35. A method, comprising:
generating a reference list of words from data encoded with an encoding scheme, wherein generating the reference list comprises:
sorting the words from the data to generate a list of included words based on memory space occupied by the words as determined by a product of a number of times that a word occurs in the data and a length of the word;
omitting words that include two or less characters, and omitting words that occur in the data only once; and
sorting the words in the list of included words according to a length of each word such that words of the same length are grouped together alphabetically;
determining which encoding values of the encoding scheme are not used to encode the data, and generating the set of encoding values from the encoding values that are not used;
indexing the words in the reference list with a set of encoding values of the encoding scheme, wherein indexing includes indexing the words in the reference list with the encoding values which are not used to encode the data; and
replacing one or more words to compress the data, each of the one or more words being replaced with a corresponding encoding value that indexes the word in the reference list.

36. One or more computer-readable media storing computer-executable instructions that, when executed by a processor, direct a computing device to perform the method of claim 35.

37. A method as recited in claim 35, wherein generating the reference list further includes generating a header section that includes the number of words of the same length that are grouped together in each of one or more alphabetized word groups.

38. A method as recited in claim 37, further comprising: searching the generated reference list for an encoding value that corresponds to a particular word indexed with the encoding value.

39. A method as recited in claim 37, further comprising: searching the generated reference list for a combination of encoding values that correspond to a word string which includes words indexed with the encoding values.

40. A method as recited in claim 37, further comprising:
receiving a request to search for a word in the generated reference list;
determining from the reference list an encoding value corresponding to the search word; and
searching the generated reference list for the encoding value that corresponds to the search word.

41. A method as recited in claim 37, further comprising:
receiving a request to search for a word string in the generated reference list;
determining a combination of encoding values corresponding to the word string; and
searching the generated reference list for the combination of encoding values that correspond to the word string.

42. A method, comprising:
receiving a compressed program guide which includes program guide data encoded with an encoding scheme;
receiving a dictionary of words generated from the program guide data, wherein:
the words in the dictionary are indexed with a set of encoding values derived from the encoding scheme, and
the words in the dictionary are sorted according to memory space occupied by the words as determined by a product of a number of times that a word occurs in the program guide data and a length of the word;
replacing one or more of the encoding values in the compressed program guide to uncompress the program guide data, each of the one or more encoding values being replaced with a corresponding word indexed in the dictionary.

43. A method as recited in claim 42, wherein receiving the dictionary includes receiving the dictionary with the words that occupy the most memory space and with the words sorted according to a length of each word such that words of the same length are grouped together alphabetically.

44. A method as recited in claim 42, wherein receiving the dictionary includes receiving the dictionary with a header section that includes the number of words of the same length that are grouped together in each of one or more alphabetized word groups.

45. A method as recited in claim 42, further comprising searching the compressed program guide for an encoding value that corresponds to a particular word indexed in the dictionary with the encoding value.

46. A method as recited in claim 42, further comprising searching the compressed program guide for a combination of encoding values that correspond to a word string which includes words indexed in the dictionary with the encoding values.

47. A method as recited in claim 42, further comprising:
receiving a request to search for a word in the program guide data;
determining from the dictionary an encoding value corresponding to the search word; and
searching the compressed program guide for the encoding value that corresponds to the search word.

48. A method as recited in claim 42, further comprising:
receiving a request to search for a word string in the program guide data;
determining from the dictionary a combination of encoding values corresponding to the word string; and
searching the compressed program guide for the combination of encoding values that correspond to the word string.

49. One or more computer-readable media storing computer-executable instructions that, when executed by a processor, direct a computing device to perform the method of claim 42.

50. One or more computer-readable media storing computer-executable instructions that, when executed by a processor, direct a client device in a television-based entertainment system to perform the method of claim 42.

51. A data compression system, comprising:
means for generating a dictionary of words from data encoded with an encoding scheme;
means for indexing the words in the dictionary with a set of encoding values derived from the encoding scheme;
means for sorting the words in the dictionary according to memory space occupied by the words as determined by a product of a number of times that a word occurs in the data and a length of the word; and
means for replacing one or more words to compress the data, each of the one or more words being replaced with a corresponding encoding value that indexes the word in the dictionary.

52. A data compression system as recited in claim 51, further comprising means for sorting the words in the dictionary according to a length of each word such that words of the same length are grouped together alphabetically.

53. A data compression system as recited in claim 51, further comprising means for determining which encoding values of the encoding scheme are not used to encode the data, and generating the set of encoding values from the encoding values that are not used.

54. One or more computer-readable media comprising computer-executable instructions that, when executed, direct a computing device to:
generate a data compression list of words from data encoded with an encoding scheme, wherein the data compression list is generated from words based on memory space occupied by the words as determined by a product of a number of times that a word occurs in the data and a length of the word;
index the words in the data compression list with a set of encoding values derived from the encoding scheme; and
replace one or more words to compress the data, each of the one or more words being replaced with a corresponding encoding value that indexes the word in the dictionary.

55. One or more computer-readable media as recited in claim 54, further comprising computer executable instructions that, when executed, direct the computing device to sort the data compression list of words according to a length of each word such that words of the same length are grouped together alphabetically.

56. One or more computer-readable media as recited in claim 54, further comprising computer executable instructions that, when executed, direct the computing device to omit words from the data compression list that include two or less characters, and omit words from the data compression list that occur in the data only once.

57. One or more computer-readable media as recited in claim 54, further comprising computer executable instructions that, when executed, direct the computing device to generate a header section of the data compression list that includes the number of words of the same length that are grouped together in each of one or more word groups.

58. One or more computer-readable media as recited in claim 54, further comprising computer executable instructions that, when executed, direct the computing device to determine which encoding values of the encoding scheme are not used to encode the data, and generate the set of encoding values from the encoding values that are not used.

* * * * *